(12) United States Patent
Thompson et al.

(10) Patent No.: US 6,974,159 B2
(45) Date of Patent: Dec. 13, 2005

(54) PEEL-OFF COUPON REDEMPTION CARD

(75) Inventors: Kenneth Thompson, Ventura, CA (US); Debra Tak Thompson, Ventura, CA (US); James B. Thompson, Ventura, CA (US)

(73) Assignee: MCC Systems, Ventura, CA (US)

( * ) Notice: Subject to any disclaimer, the term of this patent is extended or adjusted under 35 U.S.C. 154(b) by 0 days.

(21) Appl. No.: 10/638,076

(22) Filed: Aug. 7, 2003

(65) Prior Publication Data

US 2004/0026916 A1  Feb. 12, 2004

Related U.S. Application Data

(63) Continuation-in-part of application No. 09/865,652, filed on May 25, 2001, now Pat. No. 6,623,039, which is a continuation-in-part of application No. 09/812,020, filed on Mar. 19, 2001, now Pat. No. 6,520,542.

(51) Int. Cl.[7] .............................................. G09B 19/00
(52) U.S. Cl. ......................................... 283/51; 283/70
(58) Field of Search .............................. 283/51, 70, 81, 283/101, 105

(56) References Cited

U.S. PATENT DOCUMENTS

| | | |
|---|---|---|
| 4,634,147 A * | 1/1987 | McClure ...................... 283/56 |
| 5,308,120 A | 5/1994 | Thompson |
| 5,413,384 A * | 5/1995 | Principe et al. ............... 283/81 |
| 5,417,458 A | 5/1995 | Best et al. |
| 5,501,491 A | 3/1996 | Thompson |
| D377,372 S | 1/1997 | Thompson |
| D378,220 S | 2/1997 | Thompson |
| D395,455 S | 6/1998 | Thompson |
| 5,776,287 A | 7/1998 | Best et al. |
| 5,844,230 A | 12/1998 | Lalonde |
| 5,865,470 A | 2/1999 | Thompson |
| D415,194 S | 10/1999 | Thompson |
| 6,092,841 A | 7/2000 | Best et al. |
| 6,099,043 A | 8/2000 | Story |
| 6,305,716 B1 | 10/2001 | Warther et al. |
| 6,386,591 B1 * | 5/2002 | Blank .......................... 283/75 |
| 6,520,542 B2 * | 2/2003 | Thompson et al. .......... 283/51 |

* cited by examiner

Primary Examiner—Willmon Fridie, Jr.
(74) Attorney, Agent, or Firm—Kelly, Lowry & Kelley, LLP

(57) ABSTRACT

A peel-off coupon redemption card includes a plurality of coupons releasably adhered to a base with a release liner. The release liner is composed of a material, such as a dry release adhesive or evaporative adhesive, such that when a coupon is removed from the base substantially no effective adhesive remains on the removed coupon. Each coupon preferably includes promotion indicia and an electronic redemption indicia. The electronic redemption indicia is preferably printed on a face of the coupon facing the base so that each coupon can be electronically redeemed while having sufficient space for the promotion indicia on the opposite face of the coupon.

16 Claims, 3 Drawing Sheets

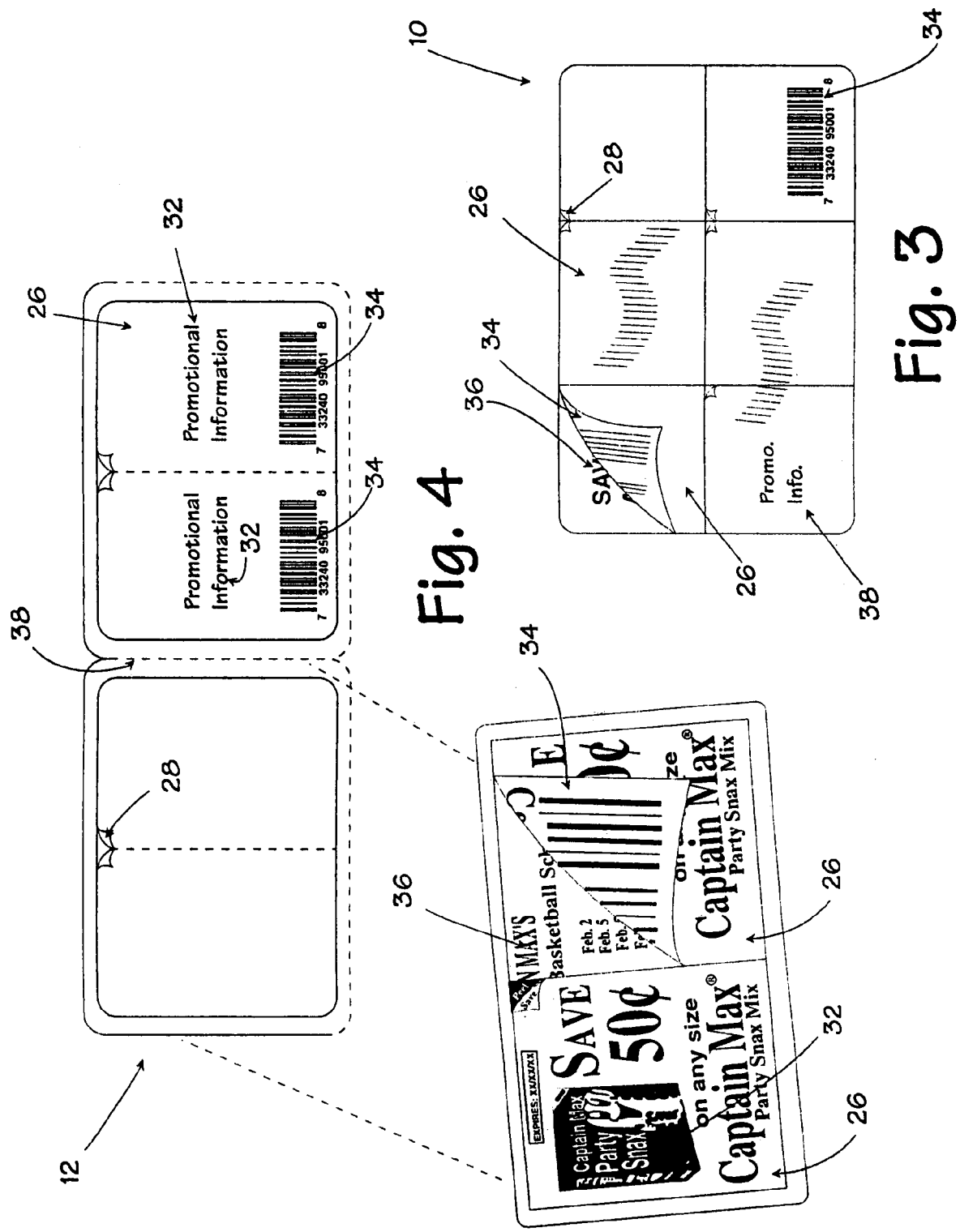

PEEL-OFF COUPON REDEMPTION CARD

RELATED APPLICATION

This application is a continuation-in-part of U.S. patent application Ser. No. 09/865,652, filed May 25, 2001, now U.S. Pat. No. 6,623,039 which is a continuation-in-part of U.S. patent application Ser. No. 09/812,020, filed Mar. 19, 2001, now U.S. Pat. No. 6,520,542.

BACKGROUND OF THE INVENTION

The present invention generally relates to coupons and coupon redemption cards. More particularly, the present invention relates to a peel-off coupon redemption card having one or more coupons which are beneficially removable with effectively no adhesive remaining on the coupon, as well as redemption means and promotion indicia printed on opposite faces of the coupon.

Cents off coupons and other types of discount coupons are a familiar marketing device, routinely used to promote the sale of various products and services by offering discounts or other types of effective price reduction upon presentation of the coupon to the seller. For example, local newspapers print various grocery item coupons, which will be honored by major supermarket chains. Coupons are also published in magazines, and are frequently mailed to households in mass mailings. Typically, the coupons are torn out or cut out with scissors. Whatever the form of distribution, prior art coupon systems are all somewhat disorganized in bulk, and hard for the consumer to keep track of.

Typically, the cashier accepts the coupons as they are presented to her at the check-out line of the retail establishment. The accepted coupons are typically placed in a special drawer, and later sorted and forwarded to the manufacturer for reimbursement. Although cumbersome, retail establishments are accustomed to this procedure.

As disclosed in U.S. Pat. Nos. 5,308,120 and 5,501,491, peel-off coupon redemption cards and tracking systems have been developed wherein small coupons are removably attached to a redemption card. Oftentimes, such redemption cards are sold as fund raising vehicles. Thus, in order to justify the cost of the redemption card, as many detachable coupons as is possible are typically formed on the back of the redemption card so that the total redemption value far exceeds the cost of the card. The holder of the card peels off a coupon at the retail establishment in order to receive the discount. When the coupon is removed, an adhesive layer remains on the back of the coupon so that it can be adhered onto a tracking sheet to assist the retail establishment in determining the total number of coupons received, etc.

However, some retail establishments find it inconvenient to train their cashiers in handling these coupons and the accompanying tracking sheet. Some cashiers, instead of adhering the coupons onto the tracking sheet, place them in the drawer for the regular coupons. Due to the adhesive layer on the removed coupon, the coupon adheres to other coupons or papers within the drawer, creating a mess. Due to the relatively small size of the removable coupons, the coupons are unable to physically support both the necessary promotion indicia as well as an electronic redemption means, such as a bar code or the like. Thus, the cashier must read the fairly small print on the removed coupon and key in the discount, or scan a bar code or the like on the redemption card itself. Having a magnetic strip or bar code on the redemption card separate from the coupons require that the coupons substantially have the same discount for the same retail establishment. Also, it is difficult to control the number of times the discount is given as the redemption card holder could potentially scan the bar code more times than the number of removable coupons provided on the redemption card itself.

Accordingly, there is a continuing need for a peel-off coupon redemption card in which the removed coupons do not have adhesive thereon, and which can be treated in a more traditional fashion. There is also a continuing need for such a redemption card wherein the removed coupon support both the promotion indicia as well as electronic scanning means for providing the discount. The present invention fulfills these needs and provides other related advantages.

SUMMARY OF THE INVENTION

The present invention resides in a peel-off coupon redemption card which overcomes the disadvantages of prior art coupons and prior peel-off coupon redemption card and tracking systems.

The peel-off redemption card of the present invention generally comprises a base having opposite first and second surfaces. One or more coupons overlay at least a portion of the base. Means for releasably adhering the coupon to the base, such as a release liner, is provided such that when the coupon is removed from the base substantially no effective adhesive remains on the removed coupon. The releaser liner may comprise a dry release adhesive, or an evaporative adhesive.

Each coupon includes promotion indicia as well as an electronic redemption means, such as a bar code. Typically, the promotion indicia is printed on a first face of the coupon, and the redemption means is disposed on an opposite second face of the coupon facing the first surface of the base.

The first surface of the base may include indicia beneath the coupon such that as the coupons are removed the indicia is viewable. Indicia may also be printed on the second surface of the base, which also may include a protective layer overlying the printed indicia.

Preferably, the base is approximately the size of a credit card so as to be easily retained in one's wallet or purse. In a particularly preferred embodiment, the base comprises two flaps pivotally connected to one another, the flaps being foldable against one another to approximately the size of a credit card.

Other features and advantages of the present invention will become apparent from the following more detailed description, taken in conjunction with the accompanying drawings, which illustrate, by way of example, the principles of the invention.

BRIEF DESCRIPTION OF THE DRAWINGS

The accompanying drawings illustrate the invention. In such drawings:

FIG. 3 is a rear elevational view of a redemption card embodying the present invention, illustrating a peel-off coupon being removed therefrom; and FIG. 4 is partially exploded and rear elevational view of a dual-flap coupon redemption card embodying the present invention.

DETAILED DESCRIPTION OF THE PREFERRED EMBODIMENTS

Figure 1:
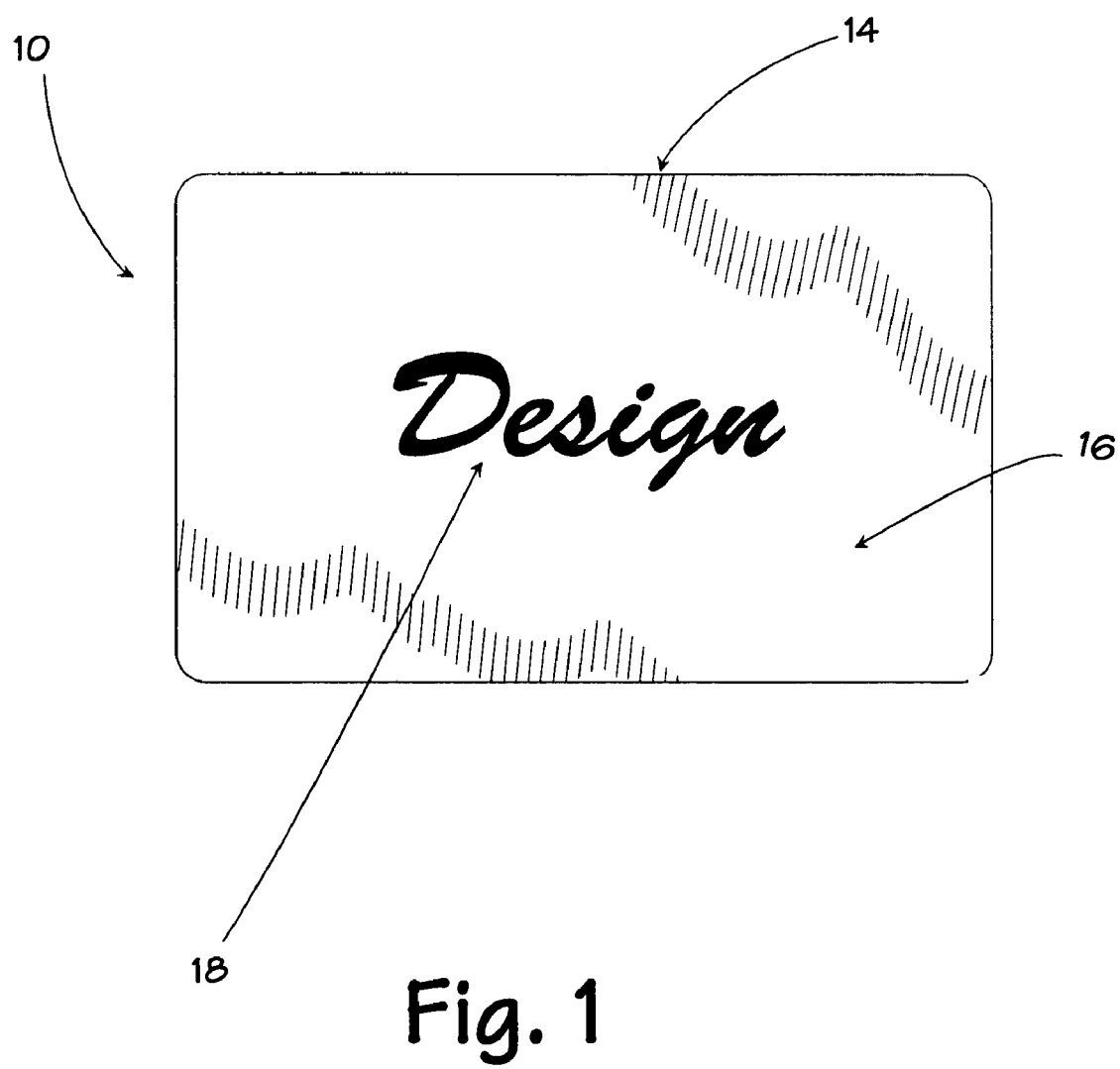
FIG. 1 is a front elevational view of a redemption card embodying the present invention.
Figure 2:
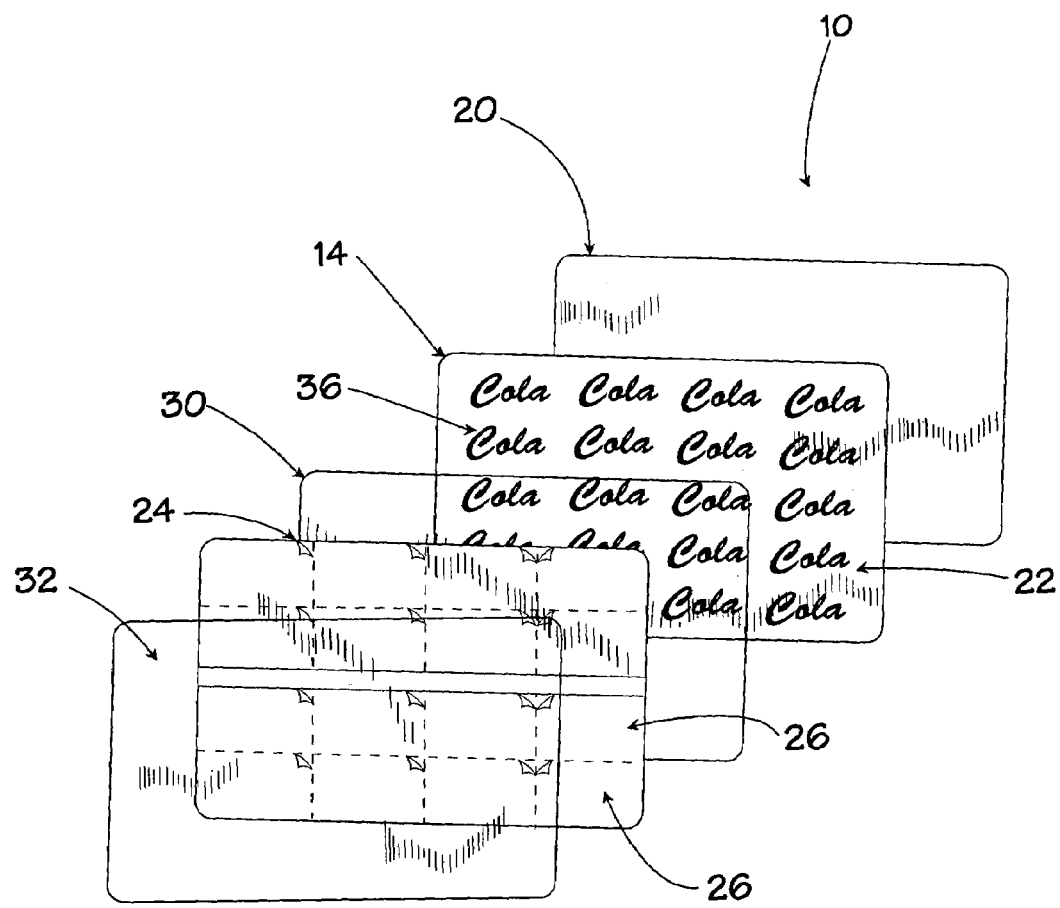
FIG. 2 is an exploded rear perspective view, illustrating various component parts of the redemption card.

As shown in the accompanying drawings for purposes of illustration, the present invention resides in a peel-off coupon redemption card, generally referred to by the reference number 10 in FIGS. 1–3 and by the reference number 12 in FIG. 4. The redemption card 10 and 12 of the present invention is designed to provide peel-off coupons which do not have substantially any adhesive remaining thereon so as to enable the coupons to be treated in a manner similar to traditional coupons. The redemption card 10 and 12 of the present invention also maximizes the allotment of space provided on each coupon by providing promotional indicia 18 on one side of each coupon, and an electronic redemption means on another side of the coupon, enabling each coupon to be electronically scanned and redeemed.

With reference now to FIGS. 1 and 2, the card 10 is fabricated from multiple sheets of superimposed, layered materials. The redemption card 10 includes a base layer 14 comprised of plastic or paper. A front surface 16 of the base layer 14 may include indicia 18 or a design 16 indicating the source of the redemption card 10 or the retailer at whose establishment the coupons will be redeemed, for example. A plastic film or clear coating 20 can be laminated or otherwise applied to the front surface 16 of the base layer 14 to provide a more durable and shiny surface to the card 10, and protect the indicia and designs 18 imprinted on the front surface 16 of the base layer 14. For example, the plastic film 20, known as "face stock", may be comprised of a clear plastic, UCL Polyolam, NPL film or other suitable substantially clear and protective coating or layer.

On the back side 22 of the base layer 14 is adhered a coupon or redemption layer 24. The coupon layer 24 includes a plurality of small coupons 26 which are removable by peeling the coupons 26 off. Preferably, multiple removable coupons 26 are formed on the redemption card 10 and 12. The detachable coupons 26 can be of any size so as to fit on the redemption card 10 and 12, although such cards 10 and 12 typically include approximately 16 peel-off coupons 26. The coupons 26 are typically created by printing the necessary promotional indicia and printing or otherwise applying the necessary electronic redemption means on at least one surface thereof, and preferably on opposite faces thereof, as will be described more fully herein. The coupon layer 24 is then "kiss cut" at regular intervals to form the matrix of small removable coupons 26. The term "kiss cut" is a printer's term and is similar to a die cut, but the cut is made sufficiently deep to form the removable coupons 26, without cutting into or through the underlying layers 14 and 20. Each coupon 26 is cut at adjoining edges by the kiss-cut process so that one can peel away a corner of the coupon 26 with one's fingernail, and then easily remove that particular coupon 26. A dog ear marking 28 may be printed at one corner of each coupon 26 to visually indicate to the user where to begin the peeling process.

With particular reference to FIG. 2, the sheet of coupons 24 is adhered to the base layer 14 by means of a release liner 30. The release liner 30 may comprise a clear plastic material which is fixedly adhered to the base layer 14, and which supports a layer of adhesive on a surface thereof facing the coupon layer 24. Alternatively, the release liner 30 may comprise the adhesive layer itself. In any event, the adhesive used is selected such that as the detachable coupons 26 are removed, essentially no adhesive remains on the coupon 26 to enable it to be placed in a drawer with other coupons and handled in traditional fashion. Examples of such adhesive include a dry release adhesive wherein essentially no adhesive remains on the second face of the detached coupon 26, or an evaporative adhesive in which some of the adhesive might be present on the detached coupon 26 but quickly evaporates therefrom upon exposure to the air. When the release liner 30 is comprised of an evaporated adhesive, it is somewhat liquid in form when applied, yet cannot evaporate or sublime because it is sealed between the base layer 14 and the coupon layer 24, until a coupon 26 is removed and exposes that portion of the adhesive release liner 30. It is important that substantially no effective adhesive 26 remain on the detached coupon 26 so that it does not stick onto other coupons and create a mess in the till of the retailer. In this manner, those retailers wishing to avoid the tracking system disclosed in the above-identified patents can treat the detached coupons 26 of the present invention in normal fashion as with other coupons which are cut out from the newspaper, for example. As discussed above, any residual adhesive left on the detached coupon 26 would cause it to stick to the other coupons in the coupon drawer, or to the cashier's fingers or to the bar code or other electronic redemption means reader.

A plastic laminate or clear coated material layer 32 may be attached to the coupon layer 24, and subject to the kiss-cut process, for added support of the coupons 26.

With reference now to FIG. 3, a back side of a redemption card 10 embodying the present invention is illustrated, with a coupon 26 partially detached from the card 10. In a particularly preferred embodiment of the present invention, in order to maximize the space provided on each detachable coupon, and allow the greatest number of coupons 26 to be placed on the card 10 to enhance its value and yet allow each coupon 16 to be electronically redeemed, each coupon includes promotional information and indicia 32 printed on one face of the coupon 26, and an electronic redemption means 34, such as the illustrated bar code, on the opposite side of the coupon 26. It should be understood that the promotional information 32 and redemption means 34 could be printed on the same face of the detachable coupon 26, although the number of detachable coupons 26 provided on each redemption card 10 would be limited in number and size. Thus, to increase the visibility of the promotional information 32, as well as the number of coupons 26, such promotional information 32 and redemption means 34 are disposed on opposite faces of the coupon 26. Thus, a consumer would typically view the promotional information for each detachable coupon 26 on the back side of the card 10, which would indicate the retail redeemer and the promotional offer, whether it be by "buy one get one free", "cents off" a particular purchase, etc. Upon peeling away the detachable coupon 26, the cashier would be able to scan the electronic redemption means 34 on the opposite side of the coupon 26. Preferably, the detached coupon 26 does not include any adhesive remaining thereon, as described above.

In a particularly preferred embodiment, the back surface 22 of the base layer 14 includes printed indica 36 such that as the coupons 26 are removed the indicia 36 is viewable. This enables the use of the space for advertising or promotional purposes. Such indicia 36 may or may not correspond with the indicia 32 on each coupon 26, or even the one or more retail establishments who are redeemers of the coupons 26.

In the illustrated embodiments in FIGS. 1–3, the redemption card 10 comprises a single card which preferably approximates the size of a credit card so as to be easily carried in one's wallet or purse. The card 10 itself is thin, 0.007" to 0.026" in thickness, and has approximate dimensions of 3.375" in length and 2.125" in width. Of course, the redemption cards 10 can be offered in various sizes to suit the needs of the potential consumers.

With reference now to FIG. 4, the card may comprise a double-flap card 12. Such a card would include segments connected at a pivoting hinge 38, allowing the sections or segments to be folded on top of one another. Preferably, the total size of the card 12, when folded, would approximate the size of a credit card so as to be easily carried in one's wallet or purse. However, the card 12 can be offered in various sizes. In fact, the hinge portion 38 can be used to actually separate the segments such that two consumers can have access to the various promotional and detachable coupons 26. The card 12 is comprised of essentially the same layers as described above, and the detachable coupons 26 are comprised as described in the previous embodiment as well, with promotional indicia 32 on one face of the coupon 26, and redemption means 34, such as a bar code, on an opposite face of the coupon 26 which is machine readable by a wand bar code reader or a stationary bar code scanner in typical fashion to electronically track the redemption of such coupons 26. Preferably, each coupon 26 is removably adhered to the underlying layer, such as the base layer 14 with a dry release or evaporative adhesive or the like such that essentially no effective adhesive remains on the detached coupon 26.

It will be appreciated by those skilled in the art that the redemption cards 10 and 12 of the present invention overcomes the traditional requirement of printing the coupon information and the redemption means which is a bar code on the same side of the conventional store coupon, thus limiting the coupon size beyond its printed requirements. The present invention allows the size of the coupon 26 to be reduced by printing the bar code 34 or other redemption means on one side, and the promotional indicia 32 on an opposite side, allowing the coupon to be much smaller, or allowing for more information to be printed thereon. Reducing the size of the coupons 26 provides an advertising and marketing advantage, because several coupons can be placed on the card 10 and 12, while still allowing electronic redemption of each coupon 26. Moreover, the use of a dry release adhesive, evaporative adhesive, or the like enables the coupons 26 to be treated in standard fashion without the need of tracking sheets and the like.

Although several embodiments of the present invention have been described in detail for purposes of illustration, various modifications of each may be made without departing from the spirit and scope of the invention. Accordingly, the invention is not to be limited, except as by the appended claims.

What is claimed is:

1. A peel-off coupon redemption card, comprising:
a base having opposite first and second generally planar surfaces, the base having a central pivot point to define two flap sections;
a coupon overlaying at least a portion of the base and including promotion indicia and electronic redemption means; and
means for releasably adhering the coupon to the base such that when the coupon is removed from the base substantially no effective adhesive remains on the coupon.

2. The redemption card of claim 1, wherein the two flaps are foldable against one another to approximately the size of a credit card.

3. A peel-off coupon redemption card, comprising:
a base having opposite first and second generally planar surfaces, and a central pivot point to define two flat sections, the base being wallet-sized so as to be carried in a wallet, pocket or purse and not attachable to merchandise, wherein the flap sections are foldable against one another to approximately the size of a credit card;
a plurality of coupons overlaying at least a portion of the base, each coupon including promotion indicia and electronic redemption means; and
a release liner which releasably adheres the coupons to the base such that when a coupon is removed from the base substantially no effective adhesive remains on the removed coupon.

4. The redemption card of claim 3, wherein the release liner comprises a dry release adhesive or an evaporative adhesive.

5. The redemption card of claim 3, wherein the promotion indicia is printed on a first face of the coupon, and the redemption means is disposed on an opposite second face of the coupon which faces the first surface of the base.

6. The redemption card of claim 5, wherein the redemption means comprises a bar code.

7. The redemption card of claim 3, including indicia printed on the first surface of the base beneath the coupon.

8. The redemption card of claim 3, including indicia printed on the second surface of the base and a protective layer overlying the printed indicia.

9. A peel-off coupon redemption card, comprising:
a base having opposite first and second generally planar surfaces and having a central pivot point to define two flap sections, the base being wallet-sized so as to be carried in a wallet, pocket or purse and not attachable to merchandise, wherein the flap sections are foldable against one another to approximately the size of a credit card;
a plurality of coupons overlaying at least a portion of the base, each coupon including promotion indicia is printed on a first face of the coupon, and redemption means disposed on an opposite second face of the coupon which faces the first surface of the base; and
a release liner which releasably adheres the coupons to the base such that when a coupon is removed from the base substantially no effective adhesive remains on the removed coupon.

10. The redemption card of claim 9, wherein the redemption means comprises a bar code.

11. The redemption card of claim 9, including indicia printed on the first surface of the base beneath the coupon.

12. The redemption card of claim 9, including indicia printed on the second surface of the base and a protective layer overlying the printed indicia.

13. The redemption card of claim 3, wherein the plurality of removable coupons include promotion indicia and redemption means for different goods or services.

14. The redemption card of claim 9, wherein the plurality of removable coupons include promotion indicia and redemption means for different goods or services.

15. A method for redeeming coupons, comprising the steps of:
providing a coupon redemption card comprising a base having opposite first and second generally planar surfaces and having a central pivot point to define two flap sections, the base being wallet-sized so as to be carried in a wallet, pocket or purse and not attachable to merchandise, and a plurality of coupons overlaying at least a portion of the base, each coupon including promotion indicia and redemption means for a predetermined good or service, and a release liner which releasably adheres the coupons to the base such that when an individual coupon is selectively removed from the base substantially no effective adhesive remains on the removed coupon, wherein the flap sections are foldable against one another to approximately the size of a credit card;

transporting the redemption card to an establishment offering the predetermined goods or services; and redeeming a coupon by peeling off a coupon from the base of the redemption card and presenting it at the establishment when purchasing the predetermined good or service for that coupon.

16. The method of claim 15, wherein each coupon includes promotion indicia printed on a first face of the coupon, and redemption means disposed on an opposite second face of the coupon which faces the first surface of the base, and wherein the redeeming step includes reading the redemption means on the second face of the coupon to obtain a predetermined discount on the good or service.

* * * * *